J. W. GROVE.
DRAFT ATTACHMENT.
APPLICATION FILED JULY 12, 1910.
984,087.
Patented Feb. 14, 1911.
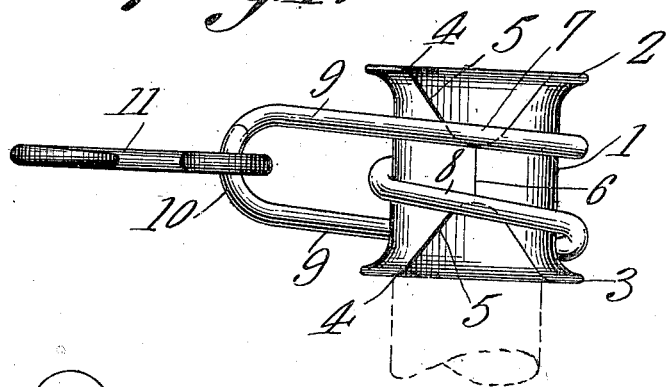
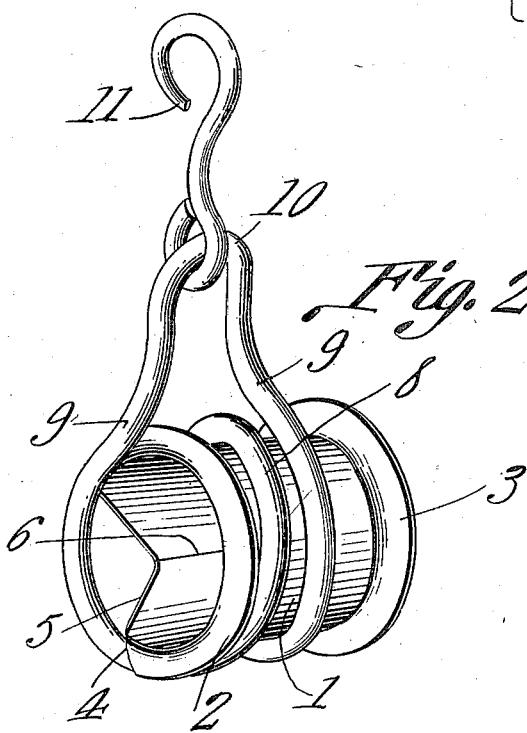
Witnesses
John W. Grove,
Inventor
by
Attorneys

UNITED STATES PATENT OFFICE.

JOHN W. GROVE, OF FREDERICK, MARYLAND.

DRAFT ATTACHMENT.

984,087.

Specification of Letters Patent. Patented Feb. 14, 1911.

Application filed July 12, 1910. Serial No. 571,638.

*To all whom it may concern:*

Be it known that I, JOHN W. GROVE, a citizen of the United States, residing at Frederick, in the county of Frederick and State of Maryland, have invented a new and useful Draft Attachment, of which the following is a specification.

This invention consists of an improved draft attachment which includes a new and useful form of ferrule or clip and a new and useful form of hook which is adapted to be readily connected with or disconnected from the ferrule when it is desired to substitute a new hook, said attachment being adapted for use in connection with swingletrees, doubletrees, tripletrees, four horse eveners and beams, draft devices used for lifting purposes, and in many other connections, not necessary to specify, where there is wear on the parts and it is desired to replace them at little expense and without loss of time.

The object of the invention is to provide a strong, simple, durable and comparatively inexpensive draft attachment which will simplify the labor of repairing the device when the hooks thereof become worn.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claims without departing from the spirit of the invention.

In the accompanying drawings forming a part of this specification:—Figure 1 is a side elevation of a ferrule and removable hook constructed in accordance with the present invention. Fig. 2 is a perspective view of the construction illustrated in Fig. 1.

Like reference numerals indicate corresponding parts in both figures of the drawing.

The improved ferrule of the present invention preferably is formed with a cylindrical portion 1 and a pair of end flanges 2 and 3. Each of the flanges 2 and 3 is notched or cut-away as indicated at 4 and the cylindrical portion 1 of the ferrule is similarly notched or cut away at each end thereof as indicated at 5 so as to form an approximately V-shaped notch, the V-shaped notch in the cylindrical portion 1 of the ferrule registering with the cut-away portion 4 of the flanges 2 and 3. The joint 6 of the ferrule is formed in the cylindrical portion 1 and extends between the inner ends or apexes of the notches or cut-away portions 5 as shown clearly in Fig. 1. The ferrule preferably although not essentially is formed of malleable metal bent into the shape described and illustrated. The hooked member of the improved attachment is detachably engaged with the ferrule or clip 1 and consists preferably of a plurality of coils 7 and 8, the end portions of the coils being extended outwardly as indicated at 9 and connected with each other at 10 for the purpose of forming a loop with which a hook 11 may be connected.

When it is desired to remove the hook member consisting of the coils 7—8 and looped portions 9—9 from the ferrule, said hook member is shoved to one end of the ferrule and is rotated. The rotation of the hook member on the ferrule or clip causes the convolutions 7 and 8 to screw or move outwardly through the notched portion of the flange and a couple of revolutions of the hook serve to wind it entirely out of engagement with the ferrule. A new hook can then be engaged with the ferrule by shoving it onto the end of the draft device and rotating it so that it winds or screws through the notch in the ferrule and thus winds into engagement with the cylindrical portion 1 thereof.

It will be understood that one of the clips or ferrules will be arranged at the middle of the draft device and one at each end thereof. The middle clip or ferrule will merely be provided with the removable shackle or hook member 9 and the hook 11 will be omitted. The ferrules or clips at the ends of the draft device will however be provided with the coiled shackles and also with the hooks 11 to receive the traces.

It will be understood that the driver of a team will be provided with one or more extra coil shackles and that whenever any of his shackles wear out, he can readily detach them and substitute new shackles in the manner indicated.

The draft attachment of the present invention is strong, simple, durable and inexpensive in construction as well as thoroughly practical and efficient in operation.

What is claimed as new is:

1. A draft attachment comprising a ferrule having a notched flange and a shackle formed with a plurality of coils adapted to be screwed through the notch of the flange into engagement with the ferrule.

2. A draft attachment comprising a ferrule having a notched flange at each end thereof and a shackle formed with a plurality of coils adapted to be screwed through the notched portion of either flange of the ferrule.

3. A draft attachment comprising a ferrule formed with a cylindrical portion and a pair of flanges, each of said flanges being notched and said cylindrical portion being notched at points adjacent the notches in the flanges, the seam of the ferrule extending between the notched portions thereof, and a shackle member having a loop portion and a plurality of coils, said coils being adapted to be passed through the notched flanges by rotating the shackle, whereby to engage the shackle with the ferrule.

4. A draft attachment comprising a ferrule having a cylindrical portion and notched ends, the seam of the ferrule extending between the notched portions thereof, said cylindrical portion of the ferrule being formed with notched flanges, and a shackle comprising a plurality of coils having their ends extended outward and joined to form a loop member, and a hook connected with said loop member, the coils of the shackle being adapted to be screwed through the notched flanges of the ferrule so as to engage the shackle with the ferrule.

5. A draft attachment having an outstanding member, and a shackle formed with a plurality of coils adapted to be screwed into engagement with the outstanding member and held in position thereby.

In testimony that I claim the foregoing as my own, I have hereto affixed my signature in the presence of two witnesses.

JOHN W. GROVE.

Witnesses:
O. C. WAREHEINE,
GEO. W. HEINLEIN.